US007876463B2

(12) United States Patent
Mizogoguchi

(10) Patent No.: US 7,876,463 B2
(45) Date of Patent: Jan. 25, 2011

(54) IMAGE OUTPUTTING SYSTEM AND COMPUTER-READABLE MEDIUM FOR OUTPUTTING IMAGE

(75) Inventor: Michiko Mizoguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1470 days.

(21) Appl. No.: 11/237,915

(22) Filed: Sep. 29, 2005

(65) Prior Publication Data

US 2006/0170959 A1 Aug. 3, 2006

(30) Foreign Application Priority Data

Jan. 31, 2005 (JP) ............................ 2005-022636

(51) Int. Cl.
*H04N 1/04* (2006.01)

(52) U.S. Cl. ...................... 358/1.15; 358/474; 358/475; 358/496

(58) Field of Classification Search ................. 348/143; 358/1.15, 474, 475, 496, 497
See application file for complete search history.

(56) References Cited

FOREIGN PATENT DOCUMENTS

| | | | |
|---|---|---|---|
| JP | S52-013721 | | 2/1977 |
| JP | 2000-339923 | | 12/2000 |
| JP | 2001-034250 | | 2/2001 |
| JP | 2001-231028 | A | 8/2001 |
| JP | 2003-9142 | A | 1/2003 |

OTHER PUBLICATIONS

"Japanese Office Action" mailed by JPO and corresponding to Japanese application No. 2005-022636 on Aug. 24, 2010, with English translation.

*Primary Examiner*—Houshang Safaipour
(74) *Attorney, Agent, or Firm*—Fujitsu Patent Center

(57) ABSTRACT

In an image outputting system, a monitor simultaneously outputs a plurality of input image data. A management server stores a management table including display starting time regarding each piece of image data. A detecting unit detects an event which requests the monitor to display new image data. A determining unit determines whether or not new image data corresponding to the detected event can be output to the monitor based on the output management information regarding each piece of the image data stored in the storing unit. When it is determined that the new image data can be output to the monitor, the monitor outputs the new image data instead of previous image data determined based on the output management information among image data previously output.

9 Claims, 14 Drawing Sheets

| TABLE NUMBER | IMAGE INDEX | | DISPLAY POSITION | OCCURRENCE TIME OF EVENT | DISPLAY STARTING TIME |
|---|---|---|---|---|---|
| | NAME OF POINT | IP ADDRESS OF ENCODER | | | |
| 1 | POINT A | 192.168.1.10 | 1 | 20:00:30 | 20:00:30 |
| 2 | POINT B | 192.168.2.2 | | | |
| 3 | POINT C | 192.168.3.11 | 2 | 20:01:05 | 20:01:05 |
| 4 | POINT D | 192.168.3.12 | 3 | 20:03:00 | 20:03:00 |
| 5 | POINT E | 192.168.4.2 | | | |
| 6 | POINT F | 192.168.4.3 | | | |
| 7 | POINT G | 192.168.5.2 | 6 | 20:10:10 | 20:10:10 |
| 8 | POINT H | 192.168.6.10 | 4 | 20:05:00 | 20:05:00 |
| 9 | POINT I | 192.168.6.11 | 5 | 20:09:30 | 20:09:30 |
| 10 | POINT J | 192.168.7.20 | | | |
| 11 | POINT K | 192.168.8.2 | 7 | 20:20:00 | 20:20:00 |
| 12 | POINT L | 192.168.8.10 | 8 | 21:00:00 | 21:00:00 |
| 13 | POINT M | 192.168.9.3 | 9 | 21:00:50 | 21:00:50 |
| 14 | POINT N | 192.168.9.4 | | | |
| 15 | POINT O | 192.168.9.5 | | | |
| 16 | POINT P | 192.168.10.21 | | | |
| | | | | | |
| | | | | | |
| | | | | | |

FIG. 3

| No. | DISPLAY (X) | DISPLAY (Y) | ENCODER | DISPLAY STARTING TIME |
|---|---|---|---|---|
| 1 | 0 | 0 | 192. 168. 1. 10 | 20:00:30 |
| 2 | 200 | 0 | 192. 168. 3. 11 | 20:01:05 |
| 3 | 400 | 0 | 192. 168. 3. 12 | 20:03:00 |
| 4 | 0 | 120 | 192. 168. 6. 10 | 20:05:00 |
| 5 | 200 | 120 | 192. 168. 6. 11 | 20:09:30 |
| 6 | 400 | 120 | 192. 168. 5. 2 | 20:10:10 |
| 7 | 0 | 240 | 192. 168. 8. 2 | 20:20:00 |
| 8 | 200 | 240 | 192. 168. 8. 10 | 21:00:00 |
| 9 | 400 | 240 | 192. 168. 9. 3 | 21:00:50 |

F I G. 4

| | | |
|---|---|---|
| 1 POINT A | 2 POINT C | 3 POINT D |
| 4 POINT H | 5 POINT I | 6 POINT G |
| 7 POINT K | 8 POINT L | 9 POINT M |

FIG. 5

| TABLE NUMBER | IMAGE INDEX | | DISPLAY POSITION | MINIMUM DISPLAY TIME | OCCURRENCE TIME OF EVENT | DISPLAY STARTING TIME |
|---|---|---|---|---|---|---|
| | NAME OF POINT | IP ADDRESS OF ENCODER | | | | |
| 1 | POINT A | 192.168.1.10 | 1 | 10 | 20:00:30 | 20:00:30 |
| 2 | POINT B | 192.168.2.2 | | | | |
| 3 | POINT C | 192.168.3.11 | 2 | 10 | 20:01:05 | 20:01:05 |
| 4 | POINT D | 192.168.3.12 | 3 | 30 | 20:03:00 | 20:03:00 |
| 5 | POINT E | 192.168.4.2 | | | | |
| 6 | POINT F | 192.168.4.3 | | | | |
| 7 | POINT G | 192.168.5.2 | 6 | 10 | 20:10:10 | 20:10:10 |
| 8 | POINT H | 192.168.6.10 | 4 | 30 | 20:05:00 | 20:05:00 |
| 9 | POINT I | 192.168.6.11 | 5 | 10 | 20:09:30 | 20:09:30 |
| 10 | POINT J | 192.168.7.20 | | | | |
| 11 | POINT K | 192.168.8.2 | 7 | 10 | 20:20:00 | 20:20:00 |
| 12 | POINT L | 192.168.8.10 | 8 | 10 | 21:00:00 | 21:00:00 |
| 13 | POINT M | 192.168.9.3 | 9 | 30 | 21:00:50 | 21:00:50 |
| 14 | POINT N | 192.168.9.4 | | | | |
| 15 | POINT O | 192.168.9.5 | | | | |
| 16 | POINT P | 192.168.10.21 | | | | |
| | | | | | | |
| | | | | | | |
| | | | | | | |

FIG. 13

| TABLE NUMBER | IMAGE INDEX | | DISPLAY AREA | DISPLAY POSITION | OCCURRENCE TIME OF EVENT | DISPLAY STARTING TIME |
|---|---|---|---|---|---|---|
| | NAME OF POINT | IP ADDRESS OF ENCODER | | | | |
| 1 | POINT A | 192.168.1.10 | S1 | 1 | 20:00:30 | 20:00:30 |
| 2 | POINT B | 192.168.2.2 | | | | |
| 3 | POINT C | 192.168.3.11 | S1 | 2 | 20:01:05 | 20:01:05 |
| 4 | POINT D | 192.168.3.12 | S1 | 3 | 20:03:00 | 20:03:00 |
| 5 | POINT E | 192.168.4.2 | | | | |
| 6 | POINT F | 192.168.4.3 | | | | |
| 7 | POINT G | 192.168.5.2 | S2 | 6 | 20:10:10 | 20:10:10 |
| 8 | POINT H | 192.168.6.10 | S1 | 4 | 20:05:00 | 20:05:00 |
| 9 | POINT I | 192.168.6.11 | S2 | 5 | 20:09:30 | 20:09:30 |
| 10 | POINT J | 192.168.7.20 | | | | |
| 11 | POINT K | 192.168.8.2 | S2 | 7 | 20:20:00 | 20:20:00 |
| 12 | POINT L | 192.168.8.10 | S2 | 8 | 21:00:00 | 21:00:00 |
| 13 | POINT M | 192.168.9.3 | S2 | 9 | 21:00:50 | 21:00:50 |
| 14 | POINT N | 192.168.9.4 | | | | |
| 15 | POINT O | 192.168.9.5 | | | | |
| 16 | POINT P | 192.168.10.21 | | | | |
| | | | | | | |
| | | | | | | |
| | | | | | | |

FIG. 14

IMAGE OUTPUTTING SYSTEM AND COMPUTER-READABLE MEDIUM FOR OUTPUTTING IMAGE

BACKGROUND OF THE INVENTION

1. Field of the Invention

The present invention relates to an image outputting system which can be used for remote monitoring with an input image, and to a control program for outputting an image.

2. Description of the Related Art

Conventionally, there are techniques related to an image displaying system for outputting and displaying images shot by a camera on a displaying unit such as a monitor or the like, in a manner which meets the requests by a user such as a purpose of the image or the like. For example, Japanese Patent Application Publication No.52-013721 discloses a technique in which a television receiver including an magnetic recording/reproducing unit displays images of television and images reproduced by the electromagnetic recording/reproducing unit such as a video tape recorder or the like, by suitably switching between both images.

In many industries such as manufacturing, distributing, financing and the like, monitoring by a camera is widely used for employing security, or for enhancing efficiency of operations as one purpose of an image displaying system. Conventionally, many of the image displaying systems used for monitoring have employed a method of recording analog image signal from an installation point of a camera in a video recorder or the like. Recently, network environments that allow high speed and high volume transmissions have become widespread, permitting remote monitoring systems to remotely monitor obtained images. Generally in a remote monitoring, image data is transmitted to a monitoring center via an IP network, Internet or the like. The image data that is transmitted is digitized and compressed in a format of MPEG (moving picture expert group), motion-JPEG or the like, in accordance with the relationship between the amount of data to be transmitted and the transmission rate of the used network, and the like.

Recently, image displaying systems have become increasingly widely employed as a form of monitoring system. Accompanying this, also a request by a user for a monitoring system which can monitor images from cameras installed at points at one monitoring center or the like in order to concentratedly monitor many branches, for example, in the case of financial institutions or a chain of stores and the like, even when points to be monitored by installing cameras increase in number. And as the points to be monitored increase in number, the load for monitoring in the monitoring center increases.

As for an image displaying system for solving the above problem, Japanese Patent Application Publication No. 2000-339923 discloses a system which detects an event requesting for the display of the image and which causes a monitor to display the image. According to a technique disclosed in the above Japanese Patent Application Publication No. 2000-339923, images whose events have occurred i.e. the images requiring the monitoring among the image signals received from a plurality of cameras are displayed preemptively on the monitor. Thereby, in a monitoring center, a user does not have to search and find the image to be interested in among the plurality of the images.

Further, Japanese Patent Application Publication No. 2001-34250 discloses a system which assigns importance to each of the images so that the images are displayed according to the importance. According to the technique disclosed in the above Japanese Patent Application Publication No. 2001-34250, the importance is determined based on the events to be occurred to subjects of cameras or the like so that the image with a greater importance is emphasized or displayed in a prescribed position, thereby making it easier for the user to pay attention to that image.

Besides, there is an image displaying system for simultaneously displaying a plurality of images by sharing one screen of a monitor. For example, sixteen images are simultaneously displayed on one monitor by dividing a screen of the monitor into areas in the same size. Alternatively, the image to be displayed is switched to another in accordance with a prescribed time interval so that images of more points are displayed on one monitor. Also, there is a system which combines and uses the method of dividing a display and the method of switching images by a prescribed time interval.

In the above image displaying systems using the method of dividing a display or the method of switching images by the time interval, it is very difficult for a single user to understand the entire situation by viewing the simultaneously displayed plural images or the images which are automatically switched by a prescribed time interval when he or she is to refer to and monitor the images. Conventionally, in order to avoid omission of monitoring, a load on one person is reduced by increasing manpower or the like. However, a broader space for systems is required to provide monitors in the greater number. Further, in the system which switches the images by a prescribed time interval, when an event occurs, the image of the event may not be displayed on the monitor.

Further, in a system disclosed in the above Japanese Patent Application Publication No. 2000-339923 in which images are switched by an occurrence of an event, the images are switched too frequently in the case that events occur frequently. As a result, there is a problem in practical use that display time for each one of the images becomes too short so that an image is switched to another before the user actually views the image and confirms the event.

SUMMARY OF THE INVENTION

It is an object of the present invention to provide an image displaying system which makes it easier for a user to actually view and confirm displayed images and a control program for displaying the image, in a system for receiving and displaying a plurality of image data.

In order to achieve the above object, an image outputting system according to the present invention comprises an outputting unit for simultaneously outputting a plurality of input image data, a storing unit for storing output management information including output starting time regarding each of image data, a detecting unit for detecting an event which requests the outputting unit to display new image data, and a determining unit for determining whether or not the new image data corresponding to the detected event can be output to the outputting unit based on the output management information regarding each piece of image data stored in the storing unit, and when it is determined that the new image data can be output to the outputting unit, the outputting unit outputs the new image data instead of a previous image data determined based on the output management information among image data previously output.

The plurality of the input image data is output to an outputting unit in parallel in time and position. When the detecting unit detects the event, it is determined whether or not the image data whose event is detected can be output based on the output management information. As for the image data whose event is detected which is determined to be able to be output, an output time to the outputting unit is ensured.

The determining unit can determine that the new image data can not be output when any of the minimum display times which have a lower limit time for which the outputting unit is made to display each piece of the image data have not elapsed from the output starting time, regarding all of the image data in the prescribed number being output to the outputting unit. For each of the image data being output to the outputting unit and the image data whose event is detected, the output time is ensured.

A recording unit can be further comprised for recording the new image data which is determined not to be able to be output by the determining unit, and the outputting unit can output the new image data recorded in the recording unit on a prescribed timing. Even when it is determined that the new image data can not be output by the determining unit, the new image data is once recorded in the recording unit and the recorded data is output later. Thereby, the output time is ensured for each piece of the image data being output to the outputting unit and the new image data determined not to be able to be output by the determining unit.

Further, when the minimum display time of any of the image data in the prescribed number being output to the outputting unit has elapsed from the output starting time, the outputting unit can stop the output of the image data being output whose minimum display time has elapsed, and can output the new image data recorded in the recording unit. The output is switched from the image whose minimum display time has elapsed to the new image data recorded in the recording unit among the plurality of the image data being simultaneously output to the outputting unit. Thereby, the outputting time is ensured for each of the image data being output and the image data recorded in the recording unit.

In addition, the present invention is not limited to the above. A control program and method of outputting image for realizing the image outputting system, and the like are also included in the present invention.

According to the present invention, in an image outputting system which can switch image data to be displayed by detecting an event, it is determined whether or not the image data whose event is detected can be output based on whether or not other image data which is currently output has been continuously output longer than a minimum time period necessary for the confirmation of the contents of the image. Thereby, a user using the system to confirm the image can confirm the image more easily because the frequency of switching of output images is not raised above the prescribed value.

BRIEF DESCRIPTION OF THE DRAWINGS

FIG. 3 shows an example of data configuration (management table) for management of the image data transmitted from the monitored points;

FIG. 4 shows an example of data configuration (management table) for management of the state of each image being displayed on a monitor;

FIG. 5 shows an example of a divided display of the monitor;

FIG. 13 shows an example of a management table according to a second embodiment of the present invention; and FIG. 14 shows an example of a management table according to a third embodiment of the present invention.

DESCRIPTION OF THE PREFERRED EMBODIMENTS

Figure 1:
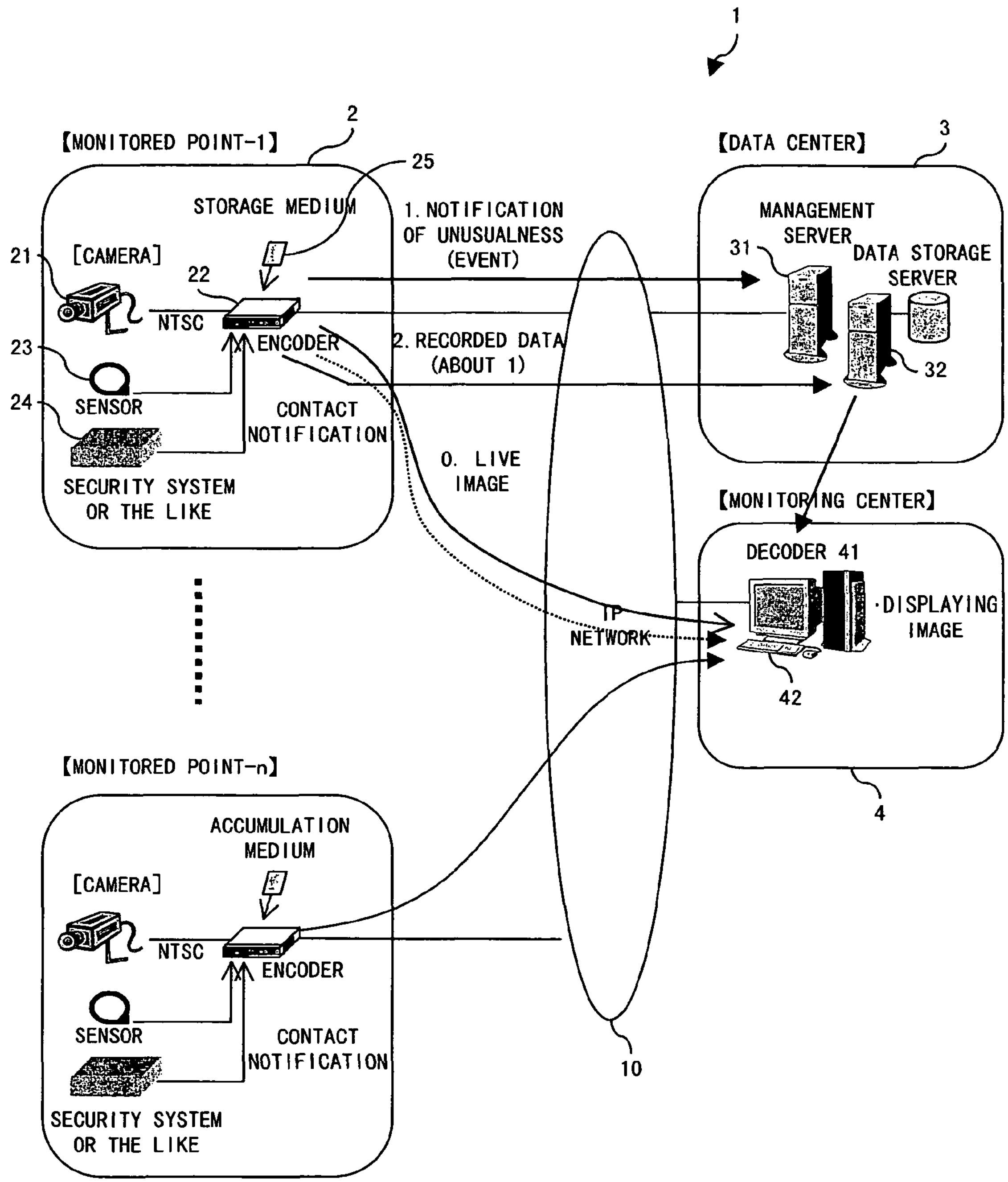
FIG. 1 shows a configuration of an image displaying system according to the present invention.

Hereinafter, the preferred embodiments of the present invention will be explained in detail, referring to the drawings.

FIG. 1 shows a configuration of an image displaying system according to the present invention. The image displaying system 1 comprises a plurality of monitored points 2, a data center 3 and a monitoring center 4, connected one another via a network 10. Examples of the network 10 to be used include an IP network.

In each of the monitored points 2, a camera 21, an encoder 22, a sensor 23, a security system 24 and a storage medium 25 are provided. The camera 21 shoots an image in the monitored point 2 to be transmitted to the data center 3 and the monitoring center 4. The encoder 22 compresses the image signal obtained from the camera 21 and converts the signal to image data in a format of MPEG or the like. Examples of the censor 23 include various types of sensors, e.g. an optical sensor such as an infrared sensor and an ultrasonic sensor and the like. The sensor 23 detects an occurrence of an event such as an alarm, action and the like in the monitored point 2. The security system 24 is an equipment for monitoring states of the monitored point 2 which are not detected by the sensor 23. Examples of the security system 24 include a communicator, a lighting device and the like. The storage medium 25 stores the image data compressed by the encoder 22.

The data center 3 comprises a management server 31 and a data storage server 32. The management server 31 includes a management table for including, for example, display management information regarding the event which has occurred and the display of the image, which is the information other than the image data among the data received from the monitored point 2. The data storage server 32 stores the image data received from each of the monitored points 2 as occasion demands.

The monitoring center 4 directly receives the image data from the monitored point 2, or indirectly receives the image data which has been once stored in the data storage server 32 of the data center 3. The monitoring center 4 comprises a decoder 41 and a monitor (outputting unit) 42. The compressed image data is decompressed in the decoder 41 and is output and displayed on the monitor 42. A user of the image displaying system 1 confirms a state of the monitored point 2 by watching the image displayed on the monitor 42. The monitor 42 displays images of a plurality of the monitored points 2 on one screen being divided for example, into nine windows or into sixteen windows.

When an event is detected in the monitored point 2, a real time image obtained from the camera 21 or a recorded image is transmitted to the monitoring center 4 via the network 10 in accordance with the monitoring state in the monitoring center 4, and is displayed on the monitor 42. The monitoring state in the monitoring center 4 is determined based on whether or not each image displayed on the monitor 42 at a time when the event is detected has been displayed continuously longer than a predetermined period of time.

Figure 2:
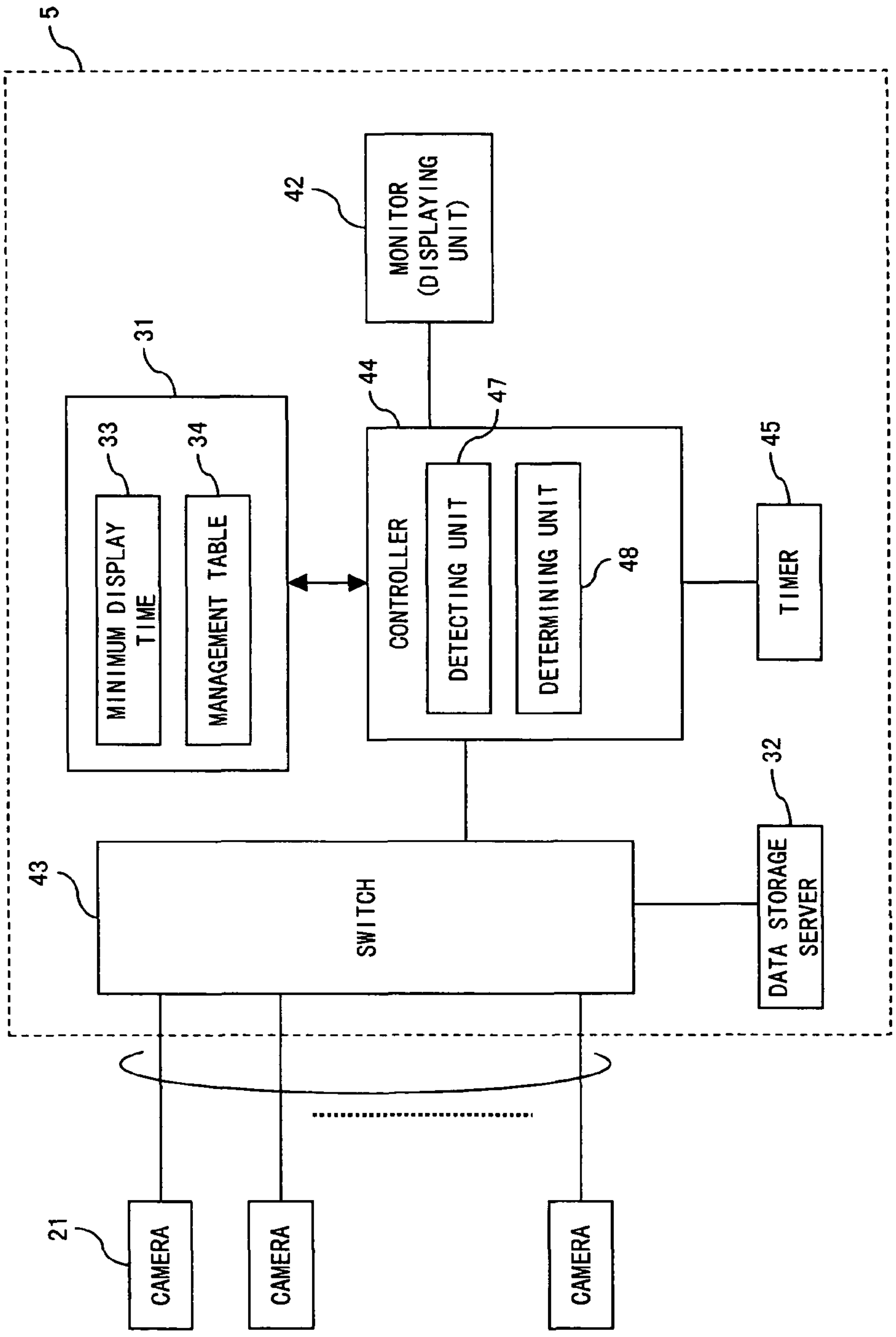
FIG. 2 is a block diagram showing functions of the present invention.

FIG. 2 is a block diagram showing functions of the present invention. An image displaying device 5 for conducting a process for displaying input image provided in the image displaying system 1 comprises the monitor (displaying unit) 42, a switch circuit 43, a controller 44, a timer 45, the data storage server (recording device) 32 and the management server 31. The image displaying device 5 is connected to a plurality of the cameras 21 via a network. The camera 21 comprises the sensor and the like for detecting events, as explained in FIG. 1.

The switch circuit 43 conducts switching so that data from the camera 21 whose image has to be displayed on the monitor 42 among the plurality of the connected cameras 21 can be received by the controller 44, and connects the desired camera to the controller 44. The timer 45 manages time during which the image from the camera 21 is to be displayed on the monitor 42, etc. in accordance with data stored in the management server 31. The data storage server 32 stores the image data from the camera 21 as occasion demands.

The controller 44 comprises a detecting unit (detecting means) 47 and a determining unit (determining means) 48. The detecting unit 47 detects receipt of the notification of an event from the camera 21. The determining unit 48 determines whether or not the image from the camera 21 which has notified the new event is to be displayed on the monitor 42 by referring to a management table 34 and a minimum display time 33. When it is determined that the above image regarding the new event can be displayed, the determining unit 48 further stops a display of other images which are currently displayed, and displays the new image. When it is determined that the above image can not be displayed, the determining unit 48 stores the image from the camera 21 which has notified the new event in the data storage server 32. The controller 44 executes an image process for causing the monitor to display the received image data, a switch control process of the switch circuit 43, and a timer management process for displaying the image during a prescribed period of time, and the like.

In addition, the data storage server 32 as a recording device is provided in the image displaying device 5 in FIG. 2, however, the configuration of the present invention is not limited to this. The recording device can be realized by the data storage medium 25 provided in each of the monitored points 2. Further, the storage device can be provided in both of the monitoring center 3 and the monitored points 2 so that a selection is made regarding which of the above locations the data is stored in. In this case, the conditions or the like for determining which location the data is stored in can be prepared beforehand in the system.

FIG. 3 shows an example of data configuration for management of the image data transmitted from the monitored points. The management table shown in FIG. 3 is referred to as an image data management table hereinafter. The image data management table comprises a table number, an image index, a display position, an occurrence time of event and a display starting time.

The table number is an identification number to be used for identifying each of the monitored points 2. The image index includes information such as a name of point, IP address of the encoder 22 and the like to be used for identifying each of the plurality of the monitored points 2. The display position includes information which specifies the position on the monitor 42 of the monitoring center 4 regarding the image data to be displayed on the monitor 42. The occurrence time of event is a time at which an event is detected by the sensor 23 and the security system 24. The display starting time is a time at which each of the image data being displayed on the monitor 42 starts to be displayed, among the plurality of the image data.

In the image displaying system 1 according to the present invention, as for information regarding the image data on the image data management table, which is displayed on the monitor 42, in other words, as for the images to which display positions are assigned, for example, the information which is needed for displaying on the monitor 42 is read from the image data management table and the read data is stored and managed on another table which will be described later.

FIG. 4 shows an example of data configuration for management of the state of each image being displayed on the monitor 42. The management table shown in FIG. 4 is referred to as a display state management table. The display state management table comprises a display number, a display position coordinate with respect to an X axis and a Y axis, an IP address of the encoder and a display starting time.

The display number is a number to be used for identifying each of windows which are displayed as the divided display on the monitor 42. The display position coordinate includes the position coordinates for specifying the display position on the monitor 42, for example as shown in FIG. 4. In the example of FIG. 4, the upper left display coordinate of the image data to be displayed is stored, assuming that the upper left corner of the monitor 42 is the original of the X axis and the Y axis, and the right direction with respect to the X axis and the lower direction of the Y axis are positive directions. The information such as the IP address of the encoder and the display starting time corresponding to the display position is read from the management table of FIG. 3, and stored in the display state management table of FIG. 4.

The monitoring center 4 determines the image to be displayed on the monitor 42 based on the information as shown in FIG. 3, which is received together with the image data. The display position, the display starting time and the like regarding the image to be displayed are managed on the display state management table shown in FIG. 4.

FIG. 5 shows an example of the divided display of the monitor 42. The display of FIG. 5 is based on the information stored in the two management tables shown in FIG. 3 and FIG. 4. On the table in FIG. 3, images are assigned the display positions in the order sequentially from the image whose occurrence time of event is the oldest in an ascending order. On the table in FIG. 4, the display position and the display starting time of each of the above images are managed. Each of the image data displayed on the monitor 42 ensures the display time at least for δt starting from the display starting time Ta in FIG. 3 and FIG. 4. Here, the δt is the minimum display time.

It is assumed that an event is further detected at the monitored point 2 whose image is not currently displayed on the monitor 42 when images are displayed on the windows of the screen being divided into nine on the monitor 42, transmitted from nine points at which events were detected. In the above case, it is determined whether or not the image of the point at which the event is newly detected is to be displayed instantaneously based on whether or not the image with the oldest display starting time has been displayed on the monitor 42 continuously longer than the minimum display time δt. Hereinafter, processes to be executed in the image displaying system 1 according to the present embodiment, upon the detection of events will be explained by referring to FIG. 6 and FIG. 7.

Figure 6:
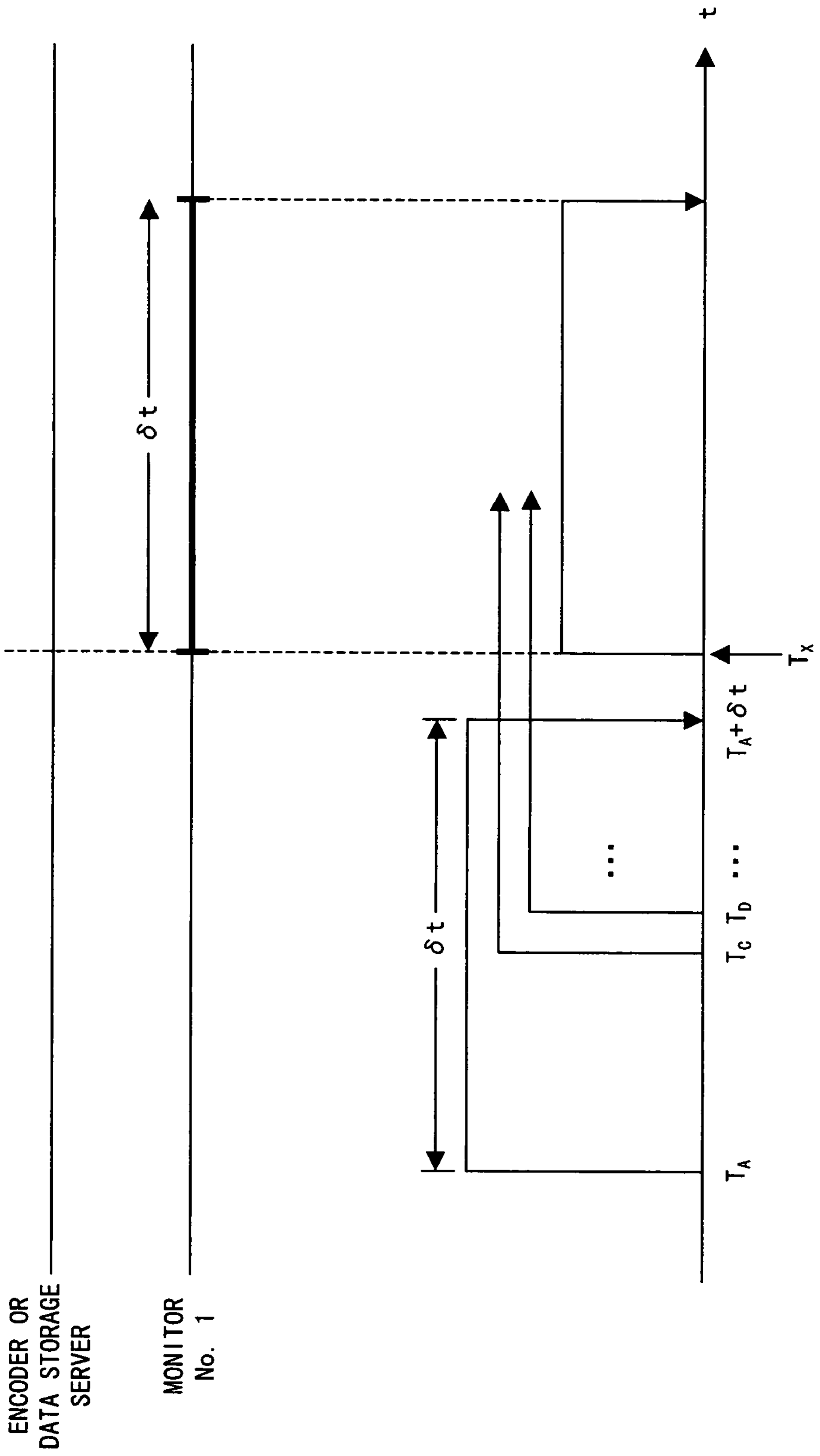
FIG. 6 is a first figure explaining a process to be executed upon a detection of an event in the image displaying system according to an embodiment of the present invention.

FIG. 6 explains a process to be executed upon the detection of an event in the image displaying system according to the present embodiment. It is assumed that the time at which the display of the image of a monitored point A starts is "$T_A$". Each of times regarding other points C, D . . . is defined similarly. Also it is assumed that the image of the point A is the image that started being displayed earliest among the images which are currently displayed on the monitor 42. Further, it is assumed that at a time when an event is detected at a monitored point X, the minimum display time δt has already elapsed from the display starting time $T_A$ regarding the image data of the point A whose display starting time is the oldest.

In the above case, the image data after the occurrence of the event is compressed by the encoder 22 and transmitted in real time to the monitoring center 4 via the network 10, and is displayed. The output of the image whose display starting time is the oldest and whose minimum display time δt has elapsed from the display starting time among the images currently displayed on the monitor 42 when the event is detected (the image of the point A in FIG. 6) is stopped, and the image of the monitored point X is output and displayed in the position "1" in which the image of the point A has been displayed. The image of the monitored point X is subsequently displayed at least for the minimum display time δt.

Switching the image which is displayed in position "1" and the information about the switched image can be displayed on the monitor 42 by means of letters or the like when the image of the monitored point X starts to be displayed on the monitor 42, so that the user can easily confirm the information regarding the above switching. For example, a frame of the image of the monitored point X can be marked in a different color or the like in order to indicate that the image in the display position "1" has been switched to another. Further, in order to show the information regarding the image of the monitored point X which newly starts to be displayed, for example, the name of the monitored point X (e.g. north exit of the "A" building or the like), name of the camera, and the like can be displayed by means of letters.

As explained above by referring to FIG. 6, when an image whose minimum display time δt has elapsed from the display starting time thereof is included in the images currently displayed on the monitor 42, the display on the monitor 42 is instantaneously switched from the above image whose minimum display time δt has elapsed to the image of the point at which the event has newly occurred. Even when there is an image to be displayed on the monitor 42 due to the occurrence of the new event, the image whose minimum display time δt has not elapsed is not switched to another image at least until the minimum display time δt elapses. The minimum display time δt is ensured for each of images of the events, so that the user can use time long enough to confirm the event. As a result, the image displaying system 1 according to the present embodiment can enhance the security by being applied to a remote monitoring.

Figure 7:
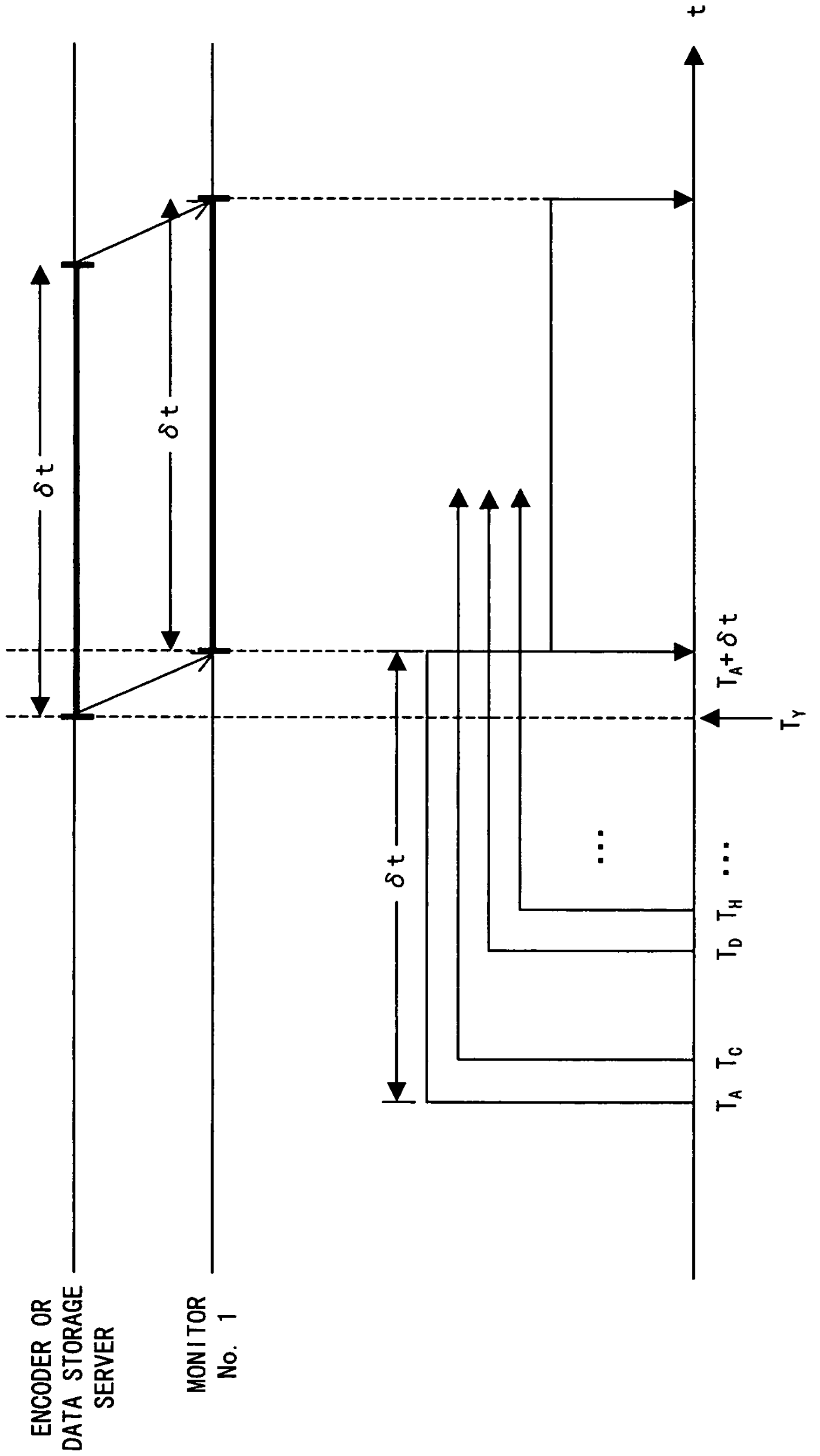
FIG. 7 is a second figure explaining a process to be executed upon a detection of an event in the image displaying system according to an embodiment of the present invention.

FIG. 7 shows another process to be executed upon the detection of an event in the image displaying system according to the present embodiment. In FIG. 7, the case is discussed that the image data of the point A whose display starting time is the oldest has not been continuously displayed for the minimum display time δt at a time when an event is detected at a monitored point Y.

In the above case, the image data of the point Y after the occurrence time of event is compressed by the encoder 22 and recorded in the storage medium 25, or is transmitted to the data center 3 via the IP network 10 and recorded in the data storage server 32. When the minimum display time δt of the image of the point A has elapsed from the display starting time $T_A$ thereof, the recorded image regarding the point Y starts to be output from the time $t=T_A+\delta t$ in the display position "1" in place of the image of the point A. The image data between the time of detection of event and the minimum display time δt is recorded, and transmitted to the monitoring center 4 from the encoder 22 or from the data storage server 32. In the monitoring center 4, the compressed data is decompressed by the encoder 41 and the recorded image is displayed at least for the minimum display time δt. After the minimum display time δt has elapsed, data transmitted from the monitored point Y is displayed in real time, for example.

In addition, it is also possible that information regarding the monitored point Y at which the event is detected is displayed on the monitor 42 by means of letters even while the image of the point A is still displayed on the monitor 42, in order to notify the detection of the event at the monitored point Y to the user. Examples of displayed information include a name of the monitored point Y, a name of the camera, the detection time of the event and the like. It is the same as in FIG. 6 that when display is switched from the image to the image of the monitored point Y, a frame of the image of the monitored point Y can be marked in a different color or the like.

As explained above by referring to FIG. 7, in the case that the minimum display time δt of any one of the images being currently displayed on the monitor 42 has not elapsed, the display is not switched from any image on the monitor 42 to the image of the newly detected event, but the image of the newly detected event is recorded. And, when the minimum display time δt of one image being displayed on the monitor 42 has elapsed, the display is switched from the image whose minimum display time δt has elapsed on the monitor 42 to the recorded image of the point at which an even is newly detected. Thereby, the display time which is needed for the user to confirm the event (the minimum display time δt) is ensured for the image which is previously displayed. On the other hand, the image immediately after the occurrence of an event is recorded in a recording medium such as the storage medium 25, the data storage server 42 or the like without fail. The user confirms the event by using the record data read from the recording medium so that omission of confirmation of the event can be avoided. As a result, the image displaying system 1 according to the present embodiment can enhance the security by being applied to a remote monitoring.

In addition, in FIG. 6 and FIG. 7, the case that one new event occurs is explained, however, a plurality of events can occur almost at the same time. In such a case, the processes of FIG. 6 and FIG. 7 are executed in the order from the image whose event occurred the earliest i.e. whose event was detected the earliest by referring the occurrence time of event on the management table of FIG. 3, for example.

Hereinabove, the outline of the configuration and the operations of the image displaying system 1 according to the present embodiment is explained. Hereinafter, the concrete process operations of the system will be explained by referring to FIG. 8 to FIG. 12.

Figure 8:
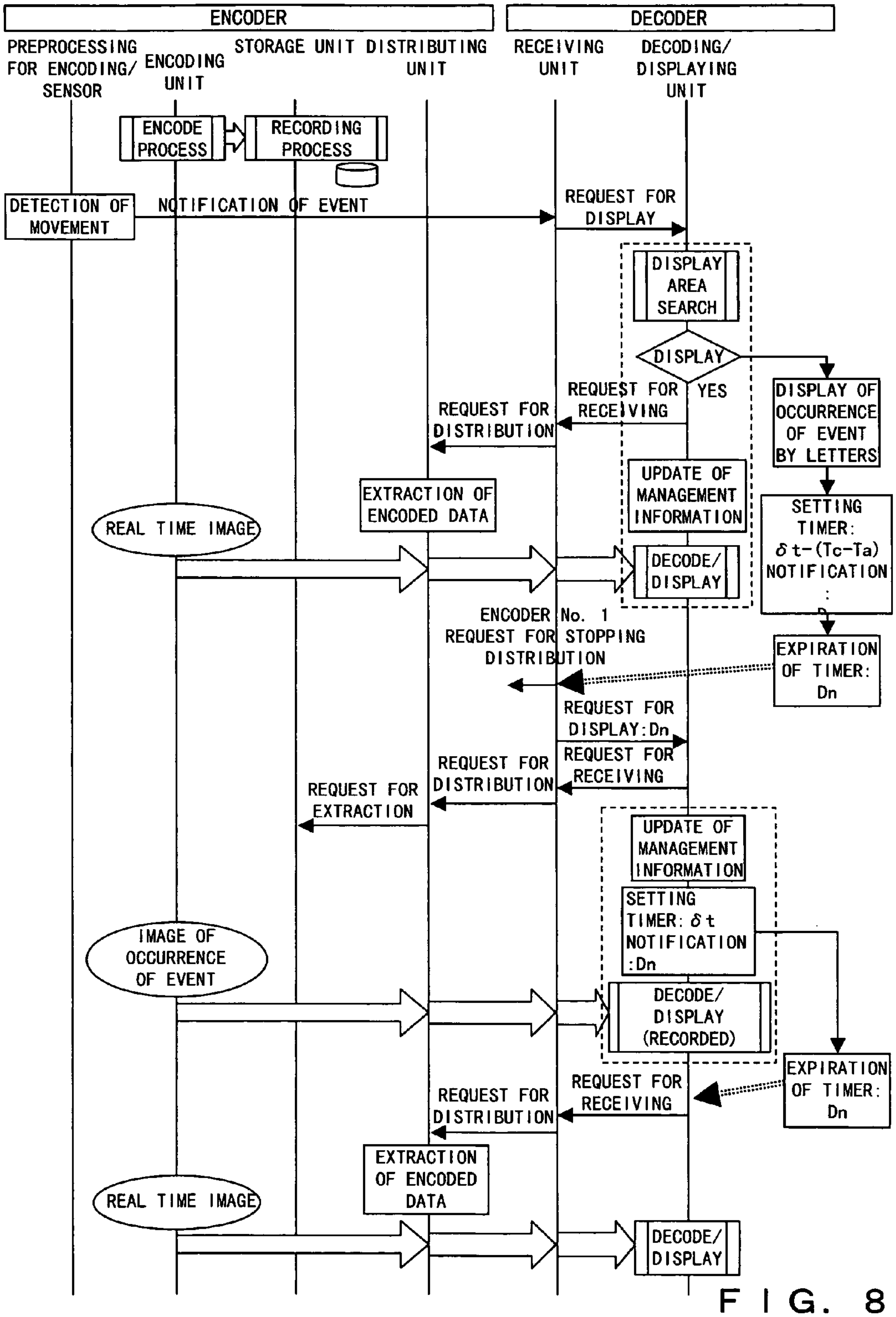
FIG. 8 shows a sequence of basic operations of the image displaying system according to an embodiment of the present invention.

FIG. 8 shows a sequence of basic operations of the image displaying system 1 according to the present embodiment.

The process to be executed in each block when an event is detected is explained by referring to FIG. 8.

Firstly in the monitored point 2, the image data obtained from the camera 21 is subject to an encoding process such as compression or the like in the encoder 22, and stored in the storage medium 25. The storage medium in FIG. 8 is not limited to the storage medium 25 in the monitored point 2. For example, the data can be stored in the data storage server 32 in the data center 3 in FIG. 1.

When an event is detected based on the analysis of the image obtained from the sensor 23, the security system 24 or the camera 21, the event is notified to the monitoring center 4. When the event is notified, a receiving unit requests to display the image of the notified event on the monitor 42. When receiving the request, a determining unit 48 determines whether or not the image can be instantaneously displayed on one of the windows made by the divided display of the monitor, by using the result of a display area search of FIG. 8.

When it is determined that the instantaneous display is possible, the image data whose event is detected is extracted from the encoder 22 in real time. The decoder 41 decompresses the received image data, and displays the decompressed data on the monitor 42.

Conversely, when it is determined that the instantaneous display is impossible, the place, time and the like at which the event was detected are notified to the user of the system by means of letters or the like. However, the image of the event is not instantaneously displayed. A timer 45 is set in order that the timer expires when the minimum display time δt has elapsed, regarding one of the images being currently displayed. The image after the detection of the event is stored in the storage unit in the monitored point 2 until the timer 45 expires and the notification is given from the monitoring center 4.

When the timer 45 expires, i.e. when the minimum display time δt of one of the images being currently displayed (the image of the point A in the above example) has elapsed, the monitored point 2 is requested to stop the distribution of the above image. After the output of the image previously displayed is stopped, the update of information of the management table managed in the management server 31 and the setting of the timer 45 regarding the image to be newly displayed are conducted. The image of the point at which the event is detected is extracted from the storage unit and the recorded data is displayed on the monitor 42. The recorded data is displayed for the minimum display time δt.

When the recorded image has been displayed for the minimum display time δt, the timer 45 expires and the expiration of the timer is notified to the decoder 41. The monitored point 2 which has transmitted the recorded data is requested to transmit the real time image of the monitored point 2 by monitoring center 4 after the timer 45 has expired, and the real time image is received via the encoder 22 and is displayed on the monitor 42.

FIG. 9 through FIG. 12 show flowcharts concretely showing processes to be executed by the decoding/displaying unit of the monitoring center 4 in the sequences of FIG. 8. Hereinafter, the process for determining whether or not the image of the point at which an event is detected can be displayed on the monitor 42 referring to the management table will be explained in detail, by referring to the drawings.

Figure 9:
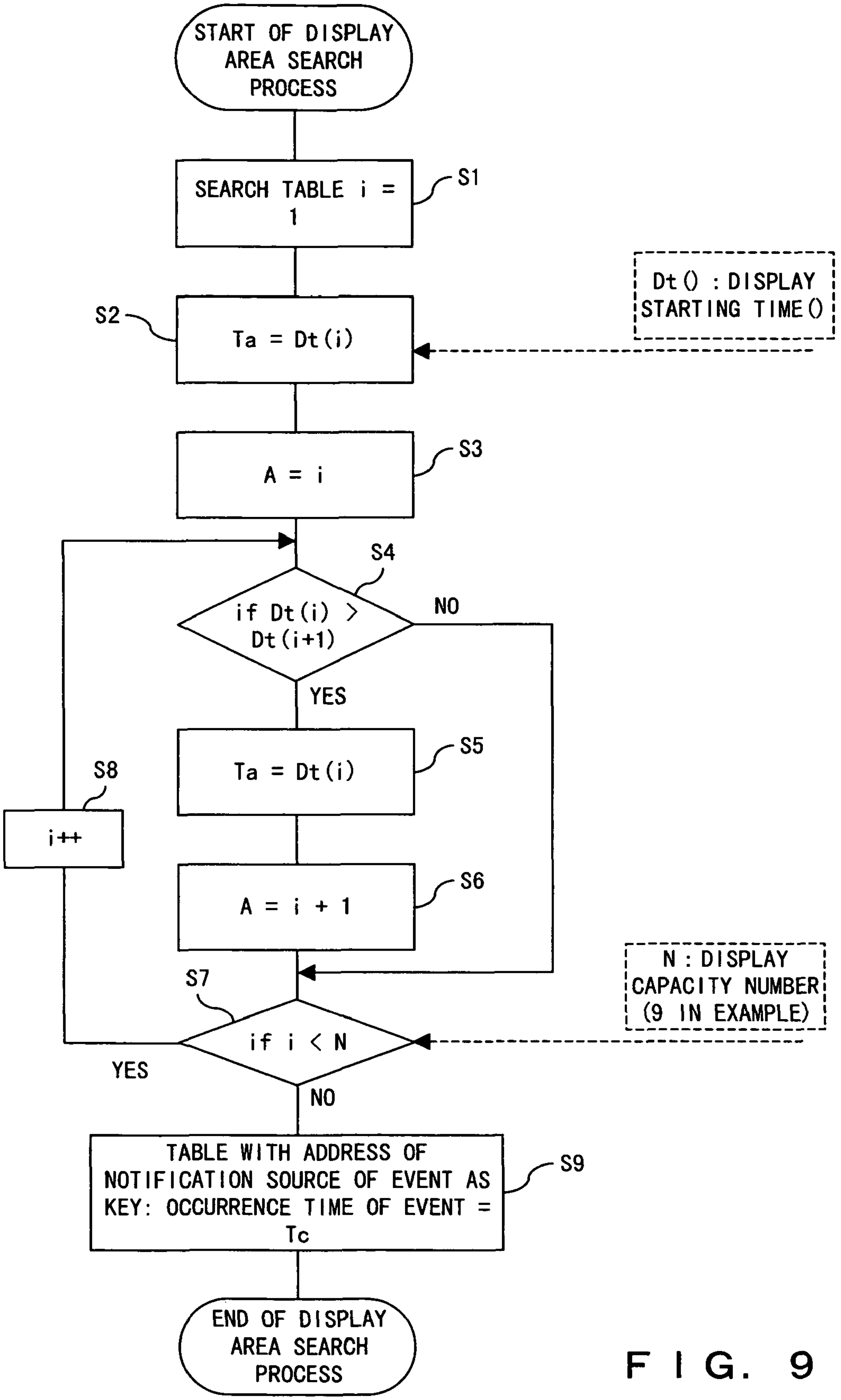
FIG. 9 is a flowchart regarding a display area search process.

FIG. 9 is a flowchart regarding a display area search process. When a detection of an event in the monitored point 2 is notified, a search is conducted, as the display area search process, on the images being currently displayed on the monitor 42 in order to determine whether or not there exits an image which can be switched to the new image regarding the display.

Firstly in step S1, the number "i" which is assigned to the image being displayed as the target of the search is initialized so that "i=1". The number "i" corresponds to the display number in FIG. 4. The display starting time of the i-th image on the monitor 42 is assumed to be Dt(i). The starting time Ta=Dt(i) is set in step S2. In step S3, the display position A=i is set.

In step S4, the values are compared between the display starting time Dt(i) and Dt(i+1). When Dt(i) is greater, the starting time Ta=Dt(i+1) is set in step S5, the display position A=i+1 is set in step S6, and the process proceeds to step S7. When Dt(i+1) is equal to or grater than Dt(i) in step S4, the process skips the steps S5 and S6, and proceeds to step S7.

In step S7, it is determined whether or not the table number "i" is smaller than a display capacity number "N" of the monitor 42. The display capacity number "N" is the maximum number of the images which can be displayed on the monitor 42 by the divided display, and in the above embodiment, N=9. When the determination result is YES in step S7, one is added to "i" in step S8, and the processes of the step S4 and the subsequent steps are executed. Thereafter, the processes from the step S4 to the step S7 are repeated until the table number "i" becomes equal to the display capacity number "N", and when i=N is realized, the process proceeds to step s9, thereafter, a current time Tc is set as the occurrence time of event Tc, and the process is ended.

As shown in FIG. 9, the occurrence time of event Tc is set regarding the image whose display starting time Dt (i) is the oldest among the images being currently displayed, by referring to the management table of FIG. 2. In the above embodiment, the occurrence time of event Tc is set regarding the image with the table number i=1 and for the point A.

Figure 10:
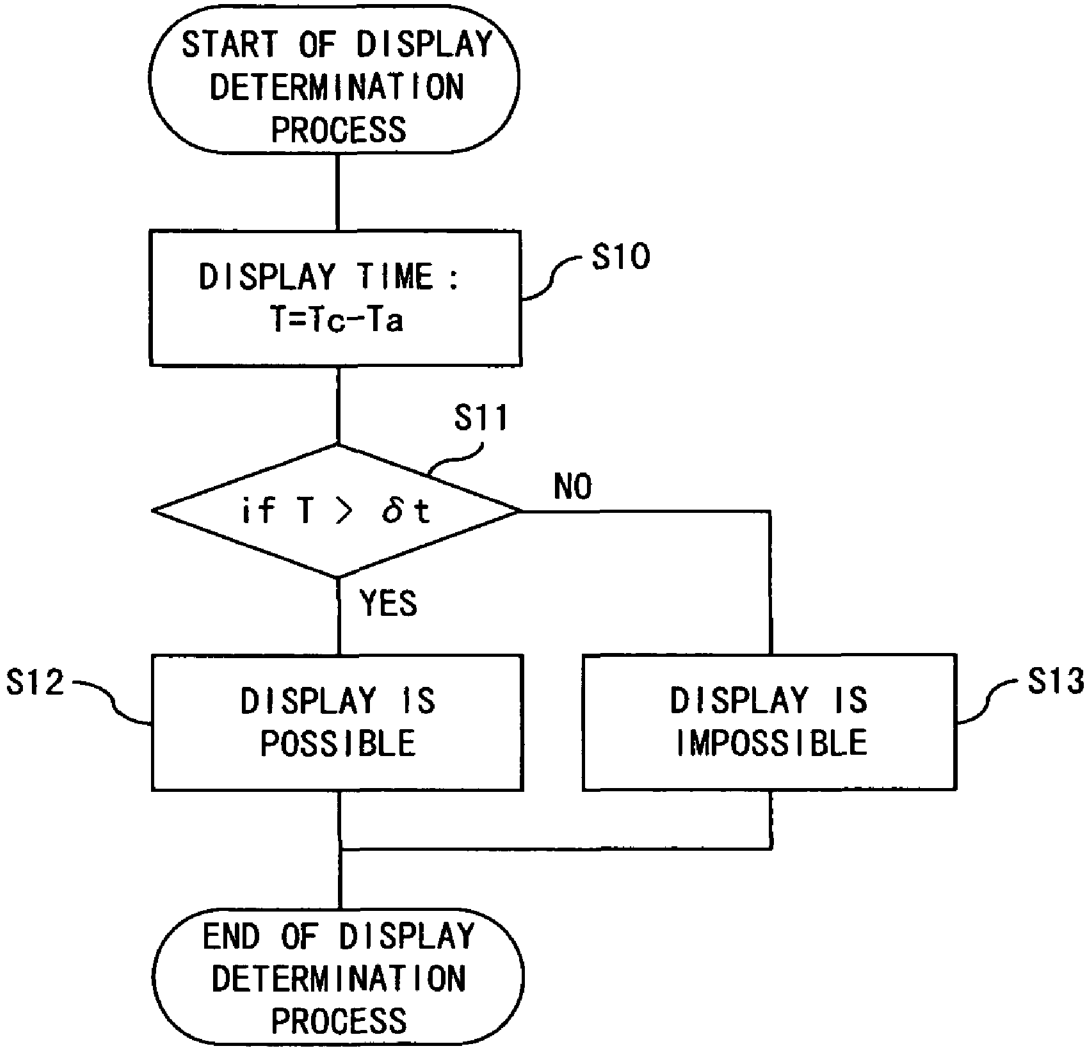
FIG. 10 is a flowchart for a process for determining whether or not an image whose occurrence time of an event is set can be displayed on the monitor.

FIG. 10 is a flowchart for a process for determining whether or not the image whose occurrence time of event is set can be displayed on the monitor 42.

Firstly in step S10, the display time T=Tc−Ta is set. The "Tc" here is the time of the moment which is set as the occurrence time of event in the step S9 of FIG. 9. In step S11, the values are compared between the display time T and the minimum display time δt. When the display time T is greater than the minimum display time δt, it is determined that the display is possible in step S12, and the process terminates. When the display time T is equal to or smaller than the minimum display time δt, it is determined that the display is impossible in step S13, and the process terminates.

Figure 11:
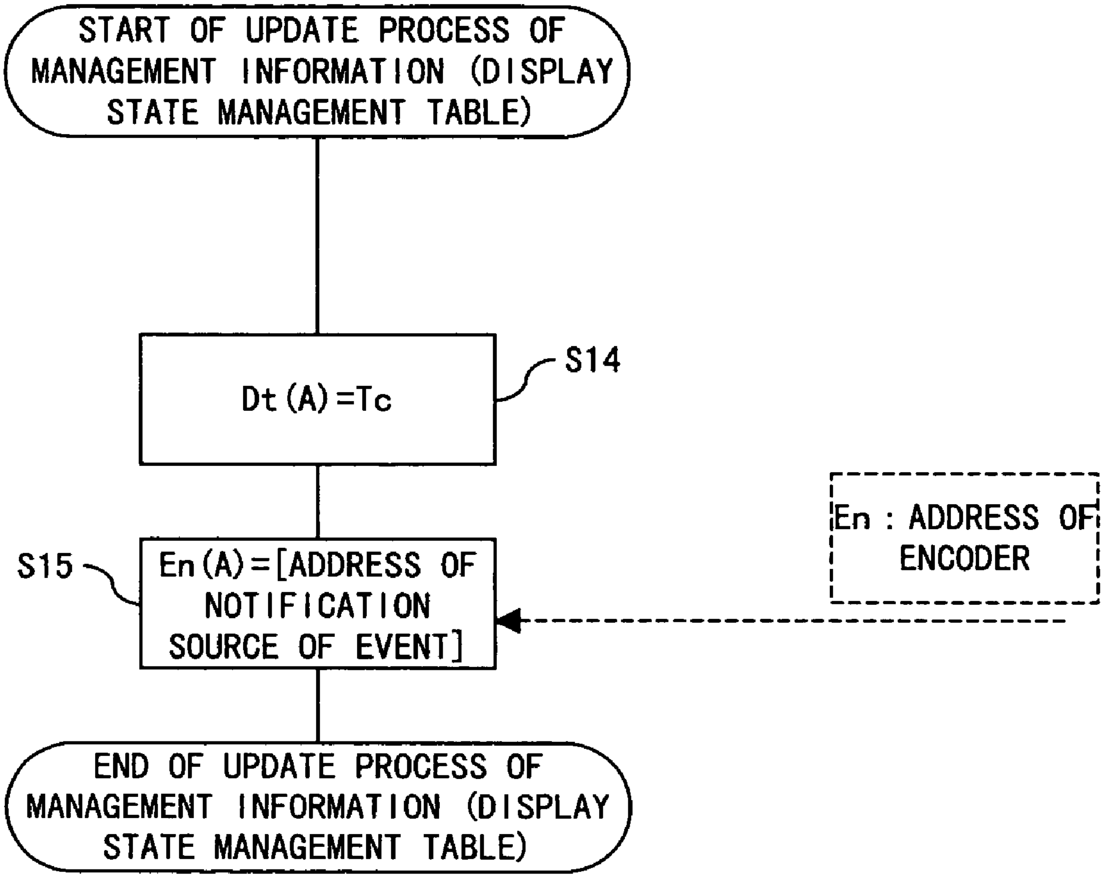
FIG. 11 is a flowchart for a process for updating a display state management table.

As shown in FIG. 10, when it is determined that the image whose event is detected can be displayed on the monitor 42, information of the display state management table shown in FIG. 4 is updated in the process of FIG. 11.

FIG. 11 is a flowchart for a process for updating the display state management table. Firstly, the display starting time Dt(A)=Tc is set in step S14. Specifically, the display starting time corresponding to the table number of the image to be newly displayed is set as the value Tc which is set in the step S9 in FIG. 9. Next in step S15, the IP address of the encoder 22 is set as the address En (A) of the notification source of the event. Thereafter, the process terminates.

As shown in FIG. 11, the display starting time of the image to be displayed in the position A is set as the time Tc of current moment. Specifically, the IP address of the encoder 22 transmitting the image is set as the address of the transmitting source. The management table shown in FIG. 3 is updated based on the display state management table updated as above.

Figure 12:
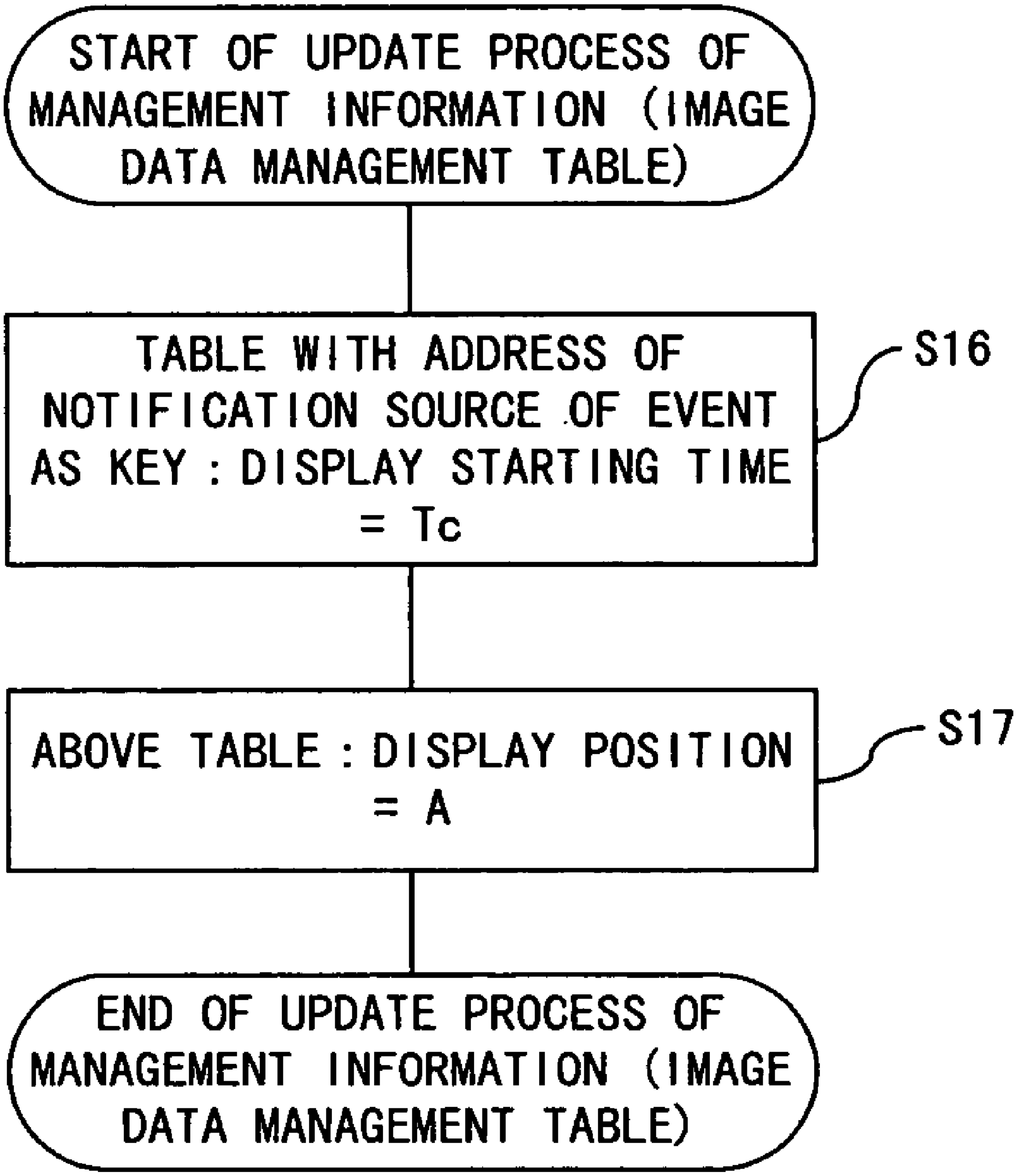
FIG. 12 is a flowchart for a process for updating the data configuration of FIG. 3.

FIG. 12 is a flowchart for a process for updating the image data management table of FIG. 3. Firstly in step S16, by using the address En (A) of the notification source of the event set in the step S15 of FIG. 11 as a key, the table number corresponding to the image index of the key is obtained from the management table of FIG. 3 so that the current moment time Tc as the display starting time corresponding to the above table number is set as the information obtained by the above process. Next in step S17, the display position corresponding to the above table number is set as the information which corresponds to "A" obtained by the above process. Thereafter, the process terminates.

As shown in FIG. 12, the management table regarding the image transmitted from each of the monitored points is updated based on the information of the display state management table managing the information regarding the image being actually displayed.

As above, by the image displaying system 1 according to the present embodiment, when an event is detected at a point, it is determined whether or not an image being displayed on the monitor 42 at a time of the detection of the event has been displayed longer than the minimum display time δt.

When there exists an image which has been displayed longer than the minimum display time δt, the display is switched from the above image to the image whose event is newly detected. The image to be switched has already been displayed on the monitor 42 at least for the minimum display time δt which is long enough for the user of the system to confirm the image. Accordingly, the display of the image thought to be already confirmed is stopped by being switched to the image whose event is newly detected, and the display of the image which newly requires confirmation starts so that the image of the point which newly requires the confirmation is displayed on the monitor 42.

When there does not exist an image which has been displayed on the monitor 42 longer than the minimum display time δt, the minimum display time δt for each of the images being currently displayed has to be ensured before the image whose event is newly detected is displayed. Accordingly, the images currently displayed continues to be displayed on the monitor 42 as they are, and the image whose event is newly detected is recorded from the time of the detection of the event. When the minimum display time δt of one of the images currently displayed on the monitor 42 has elapsed, the display is switched from the above image to the recorded image. The display of the image whose minimum display time δt has elapsed and whose confirmation by the user is thought to be completed is stopped, and the display of the recorded image from the detection of the event regarding the event which newly requires the confirmation is stared so that the image from the time from which the confirmation started to be required is displayed on the monitor 42, regarding the point requiring the confirmation.

Further, in the above embodiment, the case that images in the plurality of the monitored points are simultaneously displayed on the monitor 42 by the divided display is explained. However, the present invention is not limited to the above embodiment. For example, a configuration where an image in only one point among the plurality of the monitored points is displayed on the monitor 42 is also possible, and the above method of displaying an image is executed.

In the above embodiment, the suitable images i.e. images which have to be displayed are determined and displayed on the monitor 42 which can display the plurality of images by the divided display, by referring to the management table storing the information regarding the images from the plurality of the monitored points 2. Both of the plurality of the monitored points 2 and the windows on the divided screen of the monitor 42 weight equally. However, actually, there is the case or the like that a point which has to be monitored with a greater importance is included in the plurality of the monitored points 2 when a remote monitoring is conducted by using the image displaying system 1. In such a case, a particular monitored point which has to be monitored with a greater importance (referred to as a particular point, hereinafter) can be processed with a greater importance than the other monitored points. Hereinafter, an embodiment of the case of the particular point with a greater importance is explained.

In this case, different minimum display times are set between the particular points and the other points, for example. The minimum display time $\delta t_p$ for the particular points is set as a longer time than the minimum display time $\delta t_o$ for the other points. FIG. 13 shows an example of the management table according to a second embodiment. The management table of FIG. 13 is different from the management table according to the previous embodiment shown in FIG. 3 on the point that, on the table of FIG. 13, data for minimum display time is stored for each of the monitored points, being associated with the table number of each of the image data.

In the example of FIG. 13, an actual value is stored in unit of second as the minimum display time. When an image is displayed on the monitor 42, the minimum display time is set by referring to the value of the management table. In FIG. 13, the values are set as $\delta t_p$=30 [sec] and $\delta t_o$=10 [sec], as examples. When the values are compared between the minimum display time and the time which has elapsed since the display started regarding the image whose display starting time is the oldest on the management table in the step S11 of FIG. 10, the values read from the management table of FIG. 13 as the minimum display time is used. As for the image whose display is determined to be possible, the value stored on the management table is read, and the timer 45 is set based on the above read value. According to the present embodiment, the image of the particular point is displayed on the monitor 42 for a longer time so that the user of the image displaying system according to the present embodiment can conduct a confirmation regarding the particular point with a greater importance and more carefully.

In addition, concrete values are stored as the minimum display times, in the example of FIG. 13, however, the present invention is not limited to the above. For example, the discrimination between the particular points and the other points can be made by setting flags. Also, even if three or more sorts of the minimum display times are set instead of the above two sorts of the minimum display times, the same effect as the case of the two sorts of the minimum display times can be obtained by setting a suitable value for each of the monitored points on the management table, because the images are displayed on the monitor 42 for a time according to the values set as the minimum display time.

Further, as another embodiment, a particular number of particular areas out of the areas made by the divided display of the monitor 42 are assigned to images for the particular points in advance. For example, in the case that the screen of the monitor is divided into nine windows as shown in FIG. 5, the images with the display numbers from one to four are set to be displayed in the area S1 which is for displaying images of the particular points, and the images with the display numbers from five to nine are set to be displayed in the area S2 which is for displaying images of the other points.

FIG. 14 shows an example of a management table according to a third embodiment. The management table in FIG. 14 is different from those according to the previous embodiment in FIG. 3 and FIG. 13 on the point that the table in FIG. 14 further stores the display area information.

When the event is detected, the corresponding display area information is read from the management table of FIG. 14, and it is determined in which of the area S1 for displaying the image of the particular points and the area S2 for displaying the image of the other points, the image is to be displayed. For example, in the display area search process shown in FIG. 9, a process for determining the display area information of the image which is associated with the number "i" is executed between the step S3 and the step S4. Only when the display area information of the image whose event is detected is determined to correspond, the processes from the step S4 to the step S7 are executed and when none of the display area information corresponds, the process proceeds to the step S8.

Alternatively, it is also possible that the management tables are configured for each of the display areas, and when a process is executed on a sequence of FIG. 8 due to a detection of an event, the display area information regarding the image of the detected event is firstly read before the display area search process of FIG. 9 is executed and the process of FIG. 9 is executed regarding only the management table whose display area corresponds.

For example, it is assumed that there are one hundred monitored points. Ten points with high frequencies of event detection among the one hundred points are specified as the particular points. In this case, four windows of the nine windows displayed by the divided display are assigned to show images of the ten particular points, and the remaining five windows of the windows made by the divided display are assigned to the images of the remaining ninety monitored points. The area for displaying the images of the particular points on the monitor 42 is indicated to the user beforehand so that the user can confirm the event more easily.

What is claimed is:

1. An image outputting system, comprising:

an outputting unit to simultaneously output a plurality of input image data;

a storing unit to store output management information including output starting time regarding each piece of image data;

a detecting unit to detecting an event which requests the outputting unit to display a new piece of image data; and a determining unit to determine whether or not the new image data corresponding to the detected event can be output to the outputting unit using the output management information regarding each of the image data stored in the storing unit, wherein:

when it is determined that the new image data can be output to the outputting unit, the outputting unit outputs the new image data instead of previous image data determined using the output management information from among image data previously output, and the determining unit determines that the new image data cannot be output when each minimum display time which is a lower limit time for displaying each image data to the outputting unit has not elapsed from each output starting time, regarding all of a prescribed number of the image data being output to the outputting unit.

2. The image outputting system according to claim 1, further comprising:

a recording unit to record the new image data which is determined not to be able to be output by the determining unit, wherein:

the outputting unit outputs the new image data recorded in the recording unit on a prescribed timing.

3. The image outputting system according to claim 2, wherein:

when the minimum display time of any of the image data in the prescribed number being output to the outputting unit has elapsed from the output starting time, the outputting unit stops the output of the image data being output whose minimum display time has elapsed, and outputs the new image data recorded in the recording unit.

4. The image outputting system according to claim 1, wherein:

the storing unit further comprises a detection time at which an event is detected by the detecting unit as the output management information; and when events regarding a plurality of image data are detected within the minimum displaying time, the determining unit determines whether or not a new image data corresponding to the detected event can be output to the outputting unit sequentially in the order from the image data with the oldest detection time.

5. The image outputting system according to claim 1, further comprising:

a marking unit to mark the output of the image data regarding the image data whose output starting time is the latest among the image data output by the outputting unit.

6. The image outputting system according to claim 1, wherein:

minimum display time which is a lower limit time for which the outputting unit is caused to display each of the image data is included in the output management information; and the determining unit determines whether or not the new image data corresponding to the detected event can be output to the outputting unit using minimum display time corresponding to each of image data.

7. The image outputting system according to claim 1, wherein:

output area information regarding area in which image data can be output when each of image data is output to the outputting unit is included in the output management information; and the outputting unit determines a position in which the image data is output using the output area information, and outputs the image data.

8. A Non-Transitory computer-readable medium for storing a control program including instruction for causing a computer to execute a process of outputting a plurality of input image data to outputting unit, the instructions comprising:

outputting a plurality of input image data simultaneously;

storing output management information including output starting time regarding each piece of image data;

detecting an event which requests the outputting unit to display a new piece of image data;

determining whether or not the new image data corresponding to the detected event can be output to the outputting unit using the output management information regarding each of the stored image data;

outputting the new image data instead of previous image data determined using the output management information from among image data previously output when it is determined that the new image data can be output to the outputting unit, and determining that the new image data cannot be output when each minimum display time which is a lower limit time for displaying each image data to the outputting unit has not elapsed from each output starting time, regarding all of a prescribed number of the image data being output to the outputting unit.

9. An image outputting system, comprising:

outputting means for outputting a plurality of input image data;

storing means for storing output management information including output starting time regarding each piece of image data;

detecting means for detecting an event which requests the outputting means to display a new piece of image data; and determining means for determining whether or not the new image data corresponding to the detected event can be output to the outputting means using the output management information regarding each of the image data stored in the storing means, wherein:

when it is determined that the new image data can be output to the outputting means, the outputting means outputs the new image data instead of a previous image data determined using the output management information among image data previously output, and the determining means determines that the new image data cannot be output when each minimum display time which is a lower limit time for displaying each image data to the outputting means has not elapsed from each output starting time, regarding all of a prescribed number of the image data being output to the outputting means.

* * * * *